(12) United States Patent
Graves

(10) Patent No.: US 11,002,500 B2
(45) Date of Patent: *May 11, 2021

(54) 3-CYCLE 2-STROKE DAMPER

(71) Applicant: Thomas Allen Graves, Buda, TX (US)

(72) Inventor: Thomas Allen Graves, Buda, TX (US)

(*) Notice: Subject to any disclaimer, the term of this patent is extended or adjusted under 35 U.S.C. 154(b) by 79 days.

This patent is subject to a terminal disclaimer.

(21) Appl. No.: 16/679,992

(22) Filed: Nov. 11, 2019

(65) Prior Publication Data

US 2020/0072569 A1 Mar. 5, 2020

Related U.S. Application Data

(63) Continuation of application No. 15/959,427, filed on Apr. 23, 2018, now Pat. No. 10,502,511.

(60) Provisional application No. 62/489,453, filed on Apr. 24, 2017.

(51) Int. Cl.
| | |
|---|---|
| *F41A 5/00* | (2006.01) |
| *F41A 3/94* | (2006.01) |
| *F41C 3/00* | (2006.01) |
| *F16F 13/00* | (2006.01) |

(52) U.S. Cl.
CPC ............. *F41A 3/94* (2013.01); *F16F 13/007* (2013.01); *F41C 3/00* (2013.01)

(58) Field of Classification Search
CPC .......... F41A 17/46; F41A 17/28; F41A 17/36; F41A 17/38; F41A 19/10; F41A 3/94; F42B 5/15
USPC ...... 89/145, 147, 148, 163, 196, 37.16; 42/7
See application file for complete search history.

(56) References Cited

U.S. PATENT DOCUMENTS

| | | | |
|---|---|---|---|
| 580,925 A | 4/1897 | Browning | |
| 1,982,699 A * | 12/1934 | Simpson | ................ F41A 19/30 |
| | | | 89/131 |
| 2,373,204 A * | 4/1945 | Swebilius | ............... F41A 11/00 |
| | | | 89/193 |
| 2,823,587 A * | 2/1958 | Chadwick | ................ F41A 9/42 |
| | | | 89/4.05 |
| 3,110,221 A * | 11/1963 | Lochhead | ................. F41A 5/28 |
| | | | 89/159 |
| 3,736,839 A | 6/1973 | Childers | |
| 4,161,904 A | 7/1979 | Groen | |
| 4,253,377 A | 3/1981 | Arnett | |
| 4,539,889 A | 9/1985 | Glock | |
| 4,689,911 A | 9/1987 | White | |
| 4,770,153 A | 9/1988 | Edelman | |
| 4,901,623 A | 2/1990 | Lee | |
| 5,351,598 A | 10/1994 | Schuetz | |
| 6,889,681 B1 | 5/2005 | Alexander et al. | |
| 6,901,689 B1 | 6/2005 | Bergstrom | |
| 8,534,272 B2 | 9/2013 | Dobbins | |
| 9,395,146 B2 | 7/2016 | Tippmann, Jr. et al. | |
| 9,568,264 B2 | 2/2017 | Graves | |
| 9,816,772 B2 | 11/2017 | Graves | |

(Continued)

*Primary Examiner* — Michael D David
(74) *Attorney, Agent, or Firm* — Emerson Thomson Bennett; Timothy D. Bennett

(57) ABSTRACT

A trigger activated arm may use a piston moving within a cylinder to dampen gun bolt speed. In some embodiments, gun bolt motion increases pressure within the cylinder bore to dampen rearward gun bolt speed. The pressure may be high enough to unseat the cylinder creating a vent that cylinder fluid exits. In other embodiments, gun bolt motion decreases pressure within the cylinder bore to dampen forward gun bolt speed.

5 Claims, 3 Drawing Sheets

Front

Rear

(56) References Cited

U.S. PATENT DOCUMENTS

| | | |
|---|---|---|
| 2006/0011188 A1 | 1/2006 | Jones |
| 2007/0068502 A1 | 3/2007 | Jones et al. |
| 2007/0209650 A1 | 9/2007 | Jones |
| 2008/0276797 A1 | 11/2008 | Leitner-Wise |
| 2012/0137872 A1 | 6/2012 | Crommett |
| 2016/0161200 A1 | 6/2016 | Windauer |

* cited by examiner

3-CYCLE 2-STROKE DAMPER

This application is a divisional of U.S. patent application Ser. No. 15/959,427, filed Apr. 23, 2018, entitled 3-CYCLE 2-STROKE DAMPER, which claims priority to U.S. Provisional Patent Application No. 62/489,453, filed Apr. 24, 2017, entitled 3-CYCLE 2-STROKE DAMPER, which is incorporated herein by reference.

I. BACKGROUND

A. Field of the Invention

Let it be known that I myself, Thomas Allen Graves of Eagleshead Island, Oklahoma, currently residing in Central Texas, have invented new and useful methods and apparatuses related to automatic and semi-automatic firearm dampers. More specifically, my invention is related to the field of 3-cycle, 2-stroke piston type fluid dampers (also called captive pulse dampers).

B. Description of Related Art

In the art of firearms, specifically automatic and semiautomatic firearms, it may be desirable to utilize a fluid, typically a gas, damper to control or reduce gun bolt reciprocation rates or operating speeds. There are various known gas damper mechanisms used to do this. U.S. Pat. No. 6,901,689 to Jason Bergstrom cites conventional methods and devices.

II. SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments of this invention, an arm may comprise: a frame; a trigger that is depressible to fire the arm once per operating cycle; a gun bolt that is movable rearward and forward with respect to the frame; a surface supported to the frame; a piston supported to one of the gun bolt and the surface; a cylinder that: 1) defines a cylinder bore; 2) has cylinder fluid within the cylinder bore; and, 3) is supported to the other of the gun bolt and the surface; and, a biasing device that biases the gun bolt forward. On firing the arm, the arm may be operable to: 1) move the gun bolt rearward to cause the piston to move with respect to the cylinder to: (a) compress cylinder fluid within the cylinder bore to dampen rearward gun bolt speed; and then (b) move the cylinder with respect to the other of the gun bolt and the surface to create a vent that communicates the cylinder bore to an exterior of the cylinder bore; and then (c) force cylinder fluid to exit through the vent to the exterior of the cylinder bore; and 2) move the gun bolt forward to cause the piston to move with respect to the cylinder to reduce the pressure of cylinder fluid within the cylinder bore to dampen forward gun bolt speed.

According to some embodiments of this invention, an arm may comprise: a frame; a trigger that is depressible to fire the arm once per operating cycle; a gun bolt that is movable rearward and forward with respect to the frame; a surface that: 1) has a port; and 2) is supported to the frame; a piston supported to the gun bolt; a cylinder that: 1) defines a cylinder bore; 2) has cylinder fluid within the cylinder bore; and 3) is supported to the surface with the port communicating with the cylinder bore; and, a biasing device that biases the gun bolt forward. On firing the arm, the arm may be operable to: 1) move the gun bolt rearward to cause the piston to move with respect to the cylinder to: (a) compress cylinder fluid within the cylinder bore to dampen rearward gun bolt speed; and (b) force cylinder fluid to exit through the port to an exterior of the cylinder bore; and 2) move the gun bolt forward to cause the piston to move with respect to the cylinder to reduce the pressure of cylinder fluid within the cylinder bore to dampen forward gun bolt speed.

According to some embodiments of this invention, an arm may comprise: a frame; a trigger that is depressible to fire the arm once per operating cycle; a gun bolt that is movable rearward and forward with respect to the frame; a surface supported to the frame; a piston supported to one of the gun bolt and the surface; a cylinder that: 1) defines a cylinder bore; 2) has cylinder fluid within the cylinder bore; and, 3) is supported to the other of the gun bolt and the surface; and, a biasing device that biases the gun bolt forward. On firing the arm, the arm may be operable to: 1) move the gun bolt rearward to cause the piston to move with respect to the cylinder to compress cylinder fluid within the cylinder bore to dampen rearward gun bolt speed; and, 2) move the gun bolt forward to cause the piston to move with respect to the cylinder to: (a) reduce the pressure of cylinder fluid within the cylinder bore to dampen forward gun bolt speed; and then (b) move the piston out of contact with the cylinder bore to stop dampening forward gun bolt speed.

According to some embodiments of this invention, the biasing device may exert a biasing force to hold the piston to the one of the gun bolt and the surface; and exert a biasing force to hold the cylinder to the other of the gun bolt and the surface.

One object of this invention is to lower the operating speed of a gun bolt.

Another object of this invention is to redirect and reject heat energy.

Numerous benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
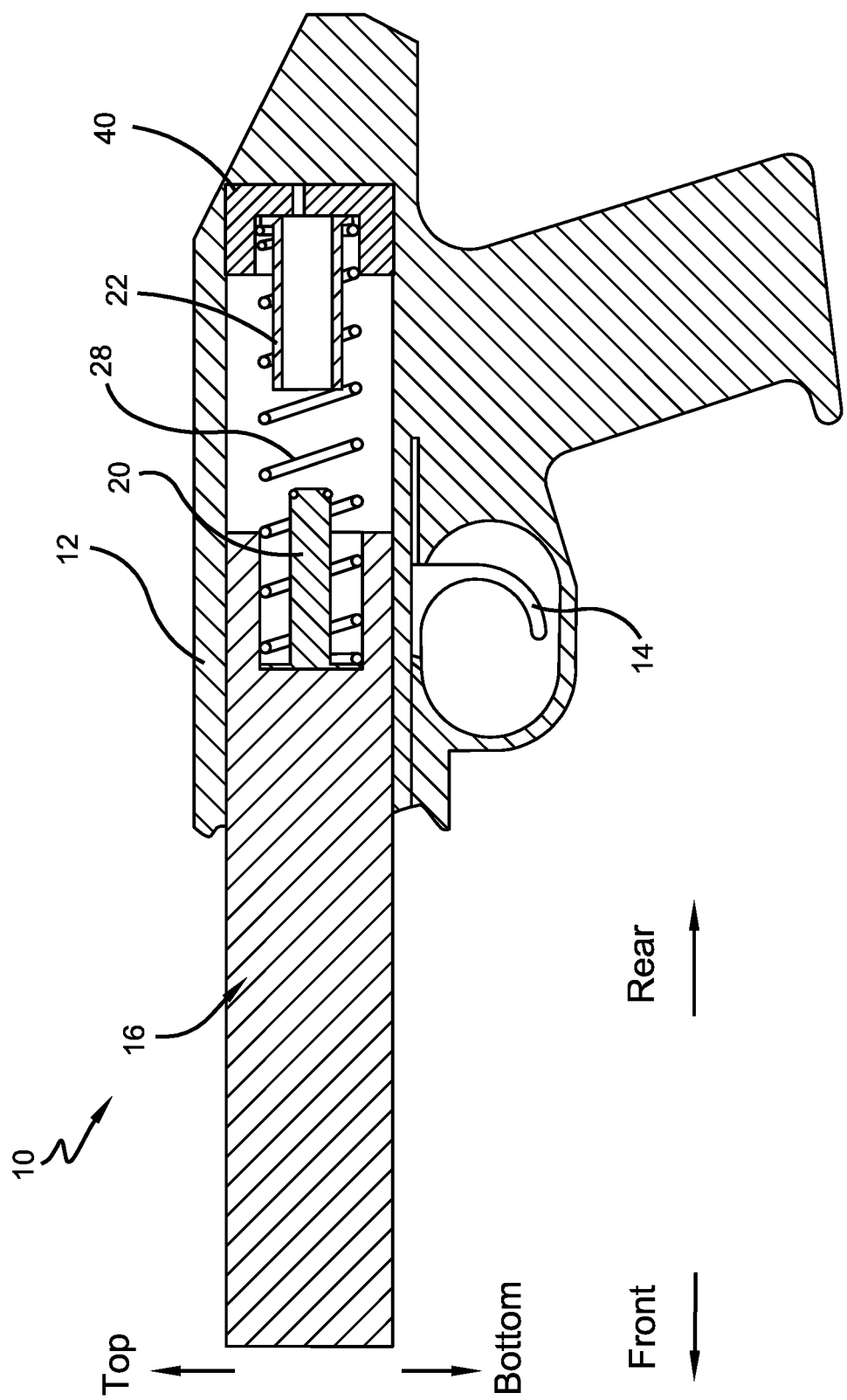
FIG. 1 illustrates a side view, in partial cutaway and with parts removed for clarity, an arm equipped with a piston and a cylinder according to some embodiments of this invention.
Figure 2:
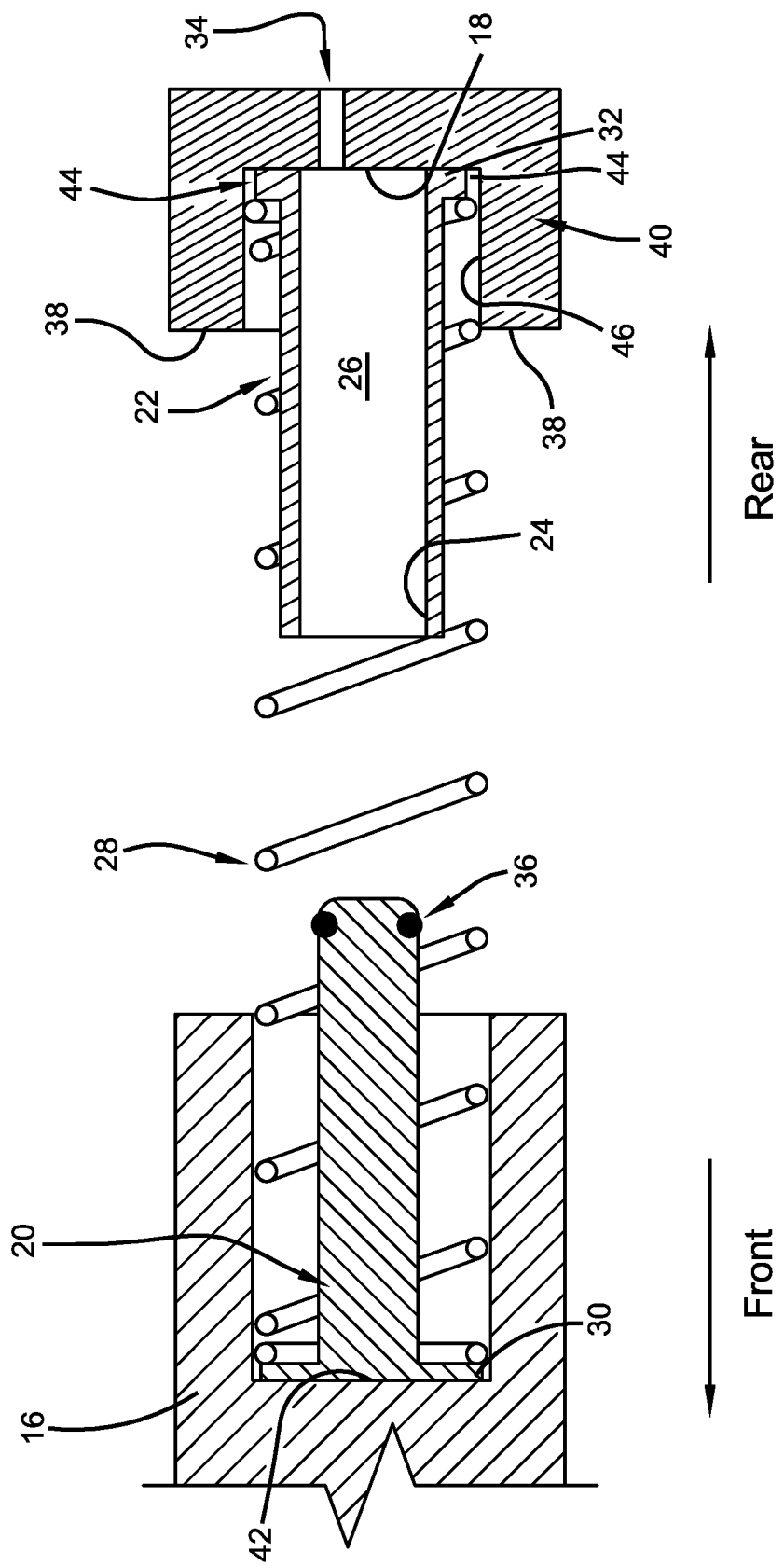
FIG. 2 is a close-up view of the piston and cylinder shown in FIG. 1.

Referring now to the drawings wherein the showings are for purposes of illustrating embodiments of the invention only and not for purposes of limiting the same, and wherein like reference numerals are understood to refer to like components, FIG. 1 shows a firearm or arm 10 that may use embodiments of this invention. The arm 10 may be an automatic or semi-automatic type arm. The arm 10 may include a frame 12 and a trigger 14 that is depressible to fire the arm once per operating cycle. With reference also to FIG. 2, a gun bolt 16 may be movable rearward and forward/frontward with respect to the frame 12 in a manner well known to those of skill in the art. A surface 18 may be supported to the frame 12. In one embodiment, the surface 18 is fixed to the frame 12. In one embodiment, shown, the surface 18 lies on a buffer/bolt stop 40. An optional port 34 may be formed in the surface 18 for a purpose to be described below. A piston 20 may be supported to either the bolt 16 or the surface 18. For the embodiment shown, the piston 20 is supported to the bolt 16. An O-ring seal 36 may be positioned on the piston 20 as shown. A cylinder 22 may be supported to the other of the bolt 16 or the surface 18. For the embodiment shown, the cylinder 22 is supported to the surface 18. Various other arm components well known to those of skill in the art are not shown in FIG. 1 for clarity.

With continuing reference to FIG. 2, the cylinder 22 may define a cylinder bore 24 that may hold or receive a cylinder fluid 26. The cylinder fluid 26 may be any fluid chosen with the sound judgement of a person of skill in the art. In one embodiment, the cylinder fluid 26 is a gas. In a more specific embodiment, the cylinder fluid 26 is atmospheric air. A biasing device 28 may bias the bolt 16 forward. The biasing device 28 may exert a biasing force to hold the piston 20 and cylinder 22 in place. In one embodiment, shown, the biasing device 28 has one end that exerts a biasing force to hold the piston 20 to surface 42 of the bolt 16 and a second end that exerts a biasing force to hold the cylinder 22 to the surface 18. In one specific embodiment, the biasing device 28 may contact piston flange 30 and cylinder flange 32 for this purpose, as shown. These flanges 30, 32 may be generally circular in cross-section. The flanges 30, 32 may be smaller than the areas of the bolt 16 and bolt stop 40 they are received in, respectively, to permit relative motion of the piston 20 and cylinder 22 with respect to the bolt 16 and bolt stop 40, respectively. In one embodiment, shown, the biasing device 28 is a coiled helical compression spring. In some embodiments, shown, the spring 28 may have a perimeter and at least a portion of the piston 20 and at least a portion of the cylinder 22 may be positioned inside the spring's perimeter.

Method of Operation

In FIGS. 1 and 2, bolt 16 is illustrated in the most forward position relative to the surface 18 and the biasing device 28 is at maximum expansion. The bolt 16 may be driven towards the rear through 50% of its operating cycle, to the extent that it is in physical contact with surface 38. Gun bolt contact surface 38 may be part of bolt stop 40, as shown. After maximum rearward bolt 16 movement, the compression energy stored in the biasing device 28 may force the bolt 16 back to its most forward position and in doing so complete an entire operational cycle of the gun bolt 16.

During an operating cycle of the bolt 16, the piston 20 and cylinder 22 concurrently cycle. As the bolt 16 moves rearward (travel indicated by the arrows defining the perimeter of the shaded area in FIG. 3), fluid, atmospheric air in one embodiment, is trapped within the cylinder bore 24 and becomes the cylinder fluid 26. (Note that in some embodiments, port 34 does not exist or may be plugged.) The cylinder fluid 26 will be compressed, dampening rearward bolt 16 speed. This compression may increase the cylinder fluid pressure above atmospheric pressure. This compression may continue until it reaches a value high enough (Point A in FIG. 3) to overcome the biasing force of biasing device 28 and push the cylinder 22 forward toward the bolt 16. This creates a vent 44 that communicates the cylinder bore 24 to an exterior of the cylinder bore 24, forcing cylinder fluid 26 to exit through the vent 44 to the exterior of the cylinder bore 24. This vent 44 may be defined, in one embodiment, by the rearmost surface of the cylinder 22, surface 18, the outer surface of cylinder flange 32 and an inner surface 46 of the bolt stop 40. At a full 50% of the operating cycle the pressure within the cylinder bore 24 may have maximized and dropped low enough to allow the biasing force of biasing device 28 to re-seat the cylinder flange 32 to surface 18, closing vent 44. The cylinder fluid 26 exhausted from the cylinder bore 24 must reject some quantity of heat energy, and thus remove a given amount of energy from the possible recoil energy.

During the next 50% of the operating cycle, the bolt 16 is forced forward by the recoiling biasing force from biasing device 28. This force acting on the piston 20 (which at this time is positioned within cylinder bore 24) will reduce the pressure of the cylinder fluid 26 within the cylinder bore 24, dampening forward bolt speed. In one embodiment, this pressure drop reduces the cylinder fluid pressure below atmospheric pressure (Point B in FIG. 3). This reduced pressure further functions to resist the recoiling biasing force of the biasing device 28. This pressure drop will end when the O-ring seal 36 breaks free of the cylinder bore 24 as piston 20 moves out of contact with the cylinder bore 24. This will return the pressure within cylinder bore 24 to atmospheric pressure (Point C in FIG. 3) and stop dampening bolt 16 speed (forward or rearward).

Factors

In this invention, four factors may delay the gun bolt cycle speed. Those factors are:

1. compression (work of compression converted to heat energy);

2. heat energy rejection via compressed air exhaustion (energy removed);

3. compression against atmosphere (work of compression converted to heat energy); and, 4. increased mass, or added inertial resistance of the piston.

Three of these four factors may be said to be sub-cycles of the overall 2-stroke linear piston type operational cycle. The three cycles, modes, or sub-cycles of this two stroke system are:

1. compression (against cylinder volume);

2. exhaust (wasted to atmosphere); and, 3. compression (against atmospheric air pressure).

Elaborations

Heat energy is removed from a cylinder bore volume by rejection of compressed air during the earliest 50% of an operating cycle. This rejected heat energy is not added to the recoil energy proper of a gun bolt through the remaining 50% of the operating cycle. An operating cycle is comprised of two strokes of equivalent distance. Without a captive pulse damper a gun bolt could otherwise have near identical energy during both strokes of an operating cycle, as the only energy rejection would be frictional and radiant. With a captive pulse damper a considerably practical fraction of the heat energy is rejected, or exhausted from the mechanism via gas exhaustion, and therefore unavailable on the second stroke of the operating cycle.

Figure 3:
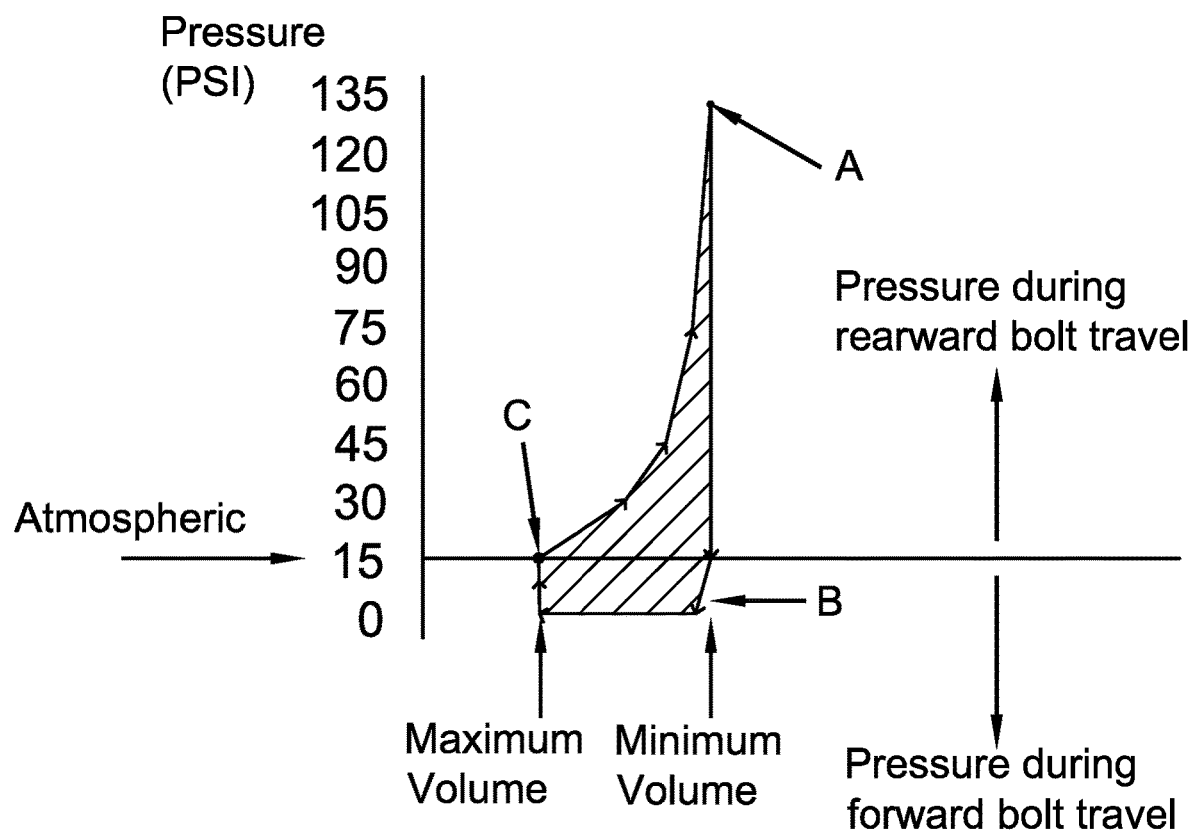
FIG. 3 is a pressure versus volume graph for a cylinder bore indicating an estimated operating cycle of an arm according to some embodiments of this invention. The operating cycle is indicated by the arrows defining the perimeter of the shaded area.

A simplified estimated example of a captive pulse damper operating cycle is depicted with a pressure versus volume graph in FIG. 3. It depicts the pressure to volume ratios relative to any given point in the operating cycle. It can be deducted from the graph that energy of the later 50% of an operating cycle is a resultant of pumping, or in otherwise pulling a vacuum (lowering the pressure below atmospheric pressure) in the sealed (or effectively restrictive) cylinder volume.

A variation of this invention may be embodied in essentially the same mechanism with perhaps only the addition of a port 34, seen in FIG. 2, that communicates with the cylinder bore 24. The inclusion of the port 34 may be practical with or without any of the intermittent valving function being performed when a cylinder 22 moves clear of surface 18. The port 34 can be useful to further modify the operating characteristics of a captive pulse damper, or to eliminate the need for any cylinder 22 to surface 18 clearance within the construct of any given captive pulse damper. As the bolt 16 moves rearward, the piston 20 moves with respect to the cylinder 22 and forces cylinder fluid 26 to exit through the port 34 to an exterior of the cylinder bore 24 and to an exterior of the surface 18.

In general a captive pulse damper will take on three different characteristics in a sequential order during cycling:

1. a high pressure air spring (adds resistance to the rearward bolt movement);
2. a heat energy rejection mechanism (removes a quantity of heat energy from consideration); and,
3. a low pressure air spring (adds resistance to the forward bolt movement).

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. Further, the "invention" as that term is used in this document is what is claimed in the claims of this document. The right to claim elements and/or sub-combinations that are disclosed herein as other inventions in other patent documents is hereby unconditionally reserved.

I claim:

1. An arm comprising:
    a frame;
    a trigger that is depressible to fire the arm once per operating cycle;
    a gun bolt that is movable rearward and forward with respect to the frame;
    a surface that: 1) has a port; and 2) is supported to the frame;
    a piston supported to the gun bolt;
    a cylinder that: 1) defines a cylinder bore; 2) has cylinder fluid within the cylinder bore; and 3) is supported to the surface with the port communicating with the cylinder bore; and,
    a biasing device that biases the gun bolt forward;
    wherein on firing the arm, the arm is operable to:
        1) move the gun bolt rearward to cause the piston to move with respect to the cylinder to: (a) compress cylinder fluid within the cylinder bore to dampen rearward gun bolt speed; and (b) force cylinder fluid to exit through the port to an exterior of the cylinder bore; and
        2) move the gun bolt forward to cause the piston to move with respect to the cylinder to reduce the pressure of cylinder fluid within the cylinder bore to dampen forward gun bolt speed.

2. The arm of claim 1 wherein the biasing device:
    exerts a biasing force to hold the piston to the one of the gun bolt and the surface; and
    exerts a biasing force to hold the cylinder to the other of the gun bolt and the surface.

3. The arm of claim 1 wherein when the piston forces cylinder fluid to exit through the port to an exterior of the cylinder bore:
    the piston forces cylinder fluid to an exterior of the surface.

4. The arm of claim 1 wherein:
    the surface lies on a bolt stop;
    the piston is supported to the gun bolt;
    the cylinder is supported to the bolt stop;
    the bolt stop has a gun bolt contact surface; and
    when the gun bolt is at the end of a rearward stroke: the gun bolt contacts the gun bolt contact surface of the bolt stop.

5. The arm of claim 1 wherein:
    when the gun bolt moves rearward and the piston moves with respect to the cylinder to compress cylinder fluid within the cylinder bore: cylinder fluid pressure rises above atmospheric pressure; and
    when the gun bolt moves forward and the piston moves with respect to the cylinder to reduce the pressure of cylinder fluid within the cylinder bore: cylinder fluid pressure falls below atmospheric pressure.

\* \* \* \* \*